J. E. TALLEY AND J. W. THOMPSON.
DISPLAY APPARATUS.
APPLICATION FILED JUNE 7, 1918.

1,393,050.

Patented Oct. 11, 1921.

Inventors:
John E. Talley,
J. W. Thompson,
by their Attorneys,
Howson & Howson

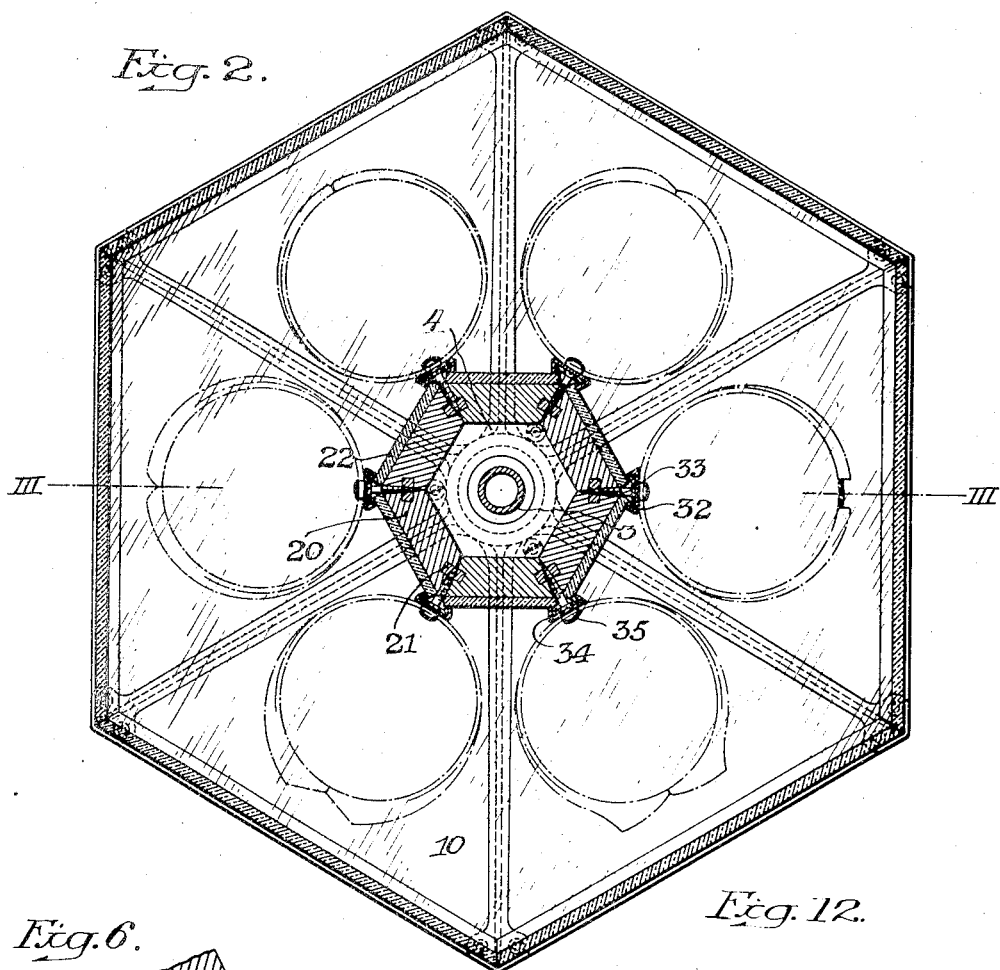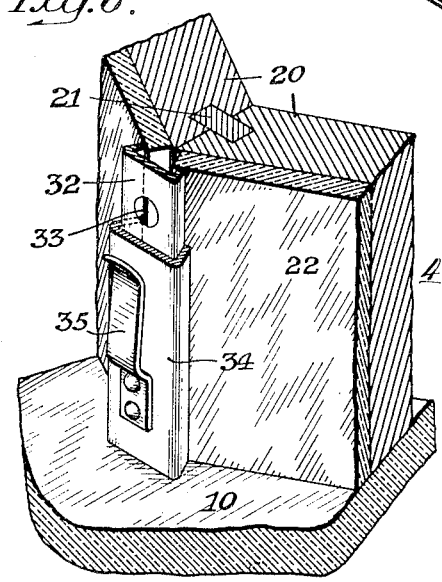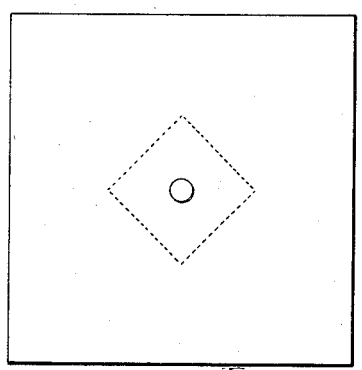

J. E. TALLEY AND J. W. THOMPSON.
DISPLAY APPARATUS.
APPLICATION FILED JUNE 7, 1918.
1,393,050.
Patented Oct. 11, 1921.
5 SHEETS—SHEET 3.
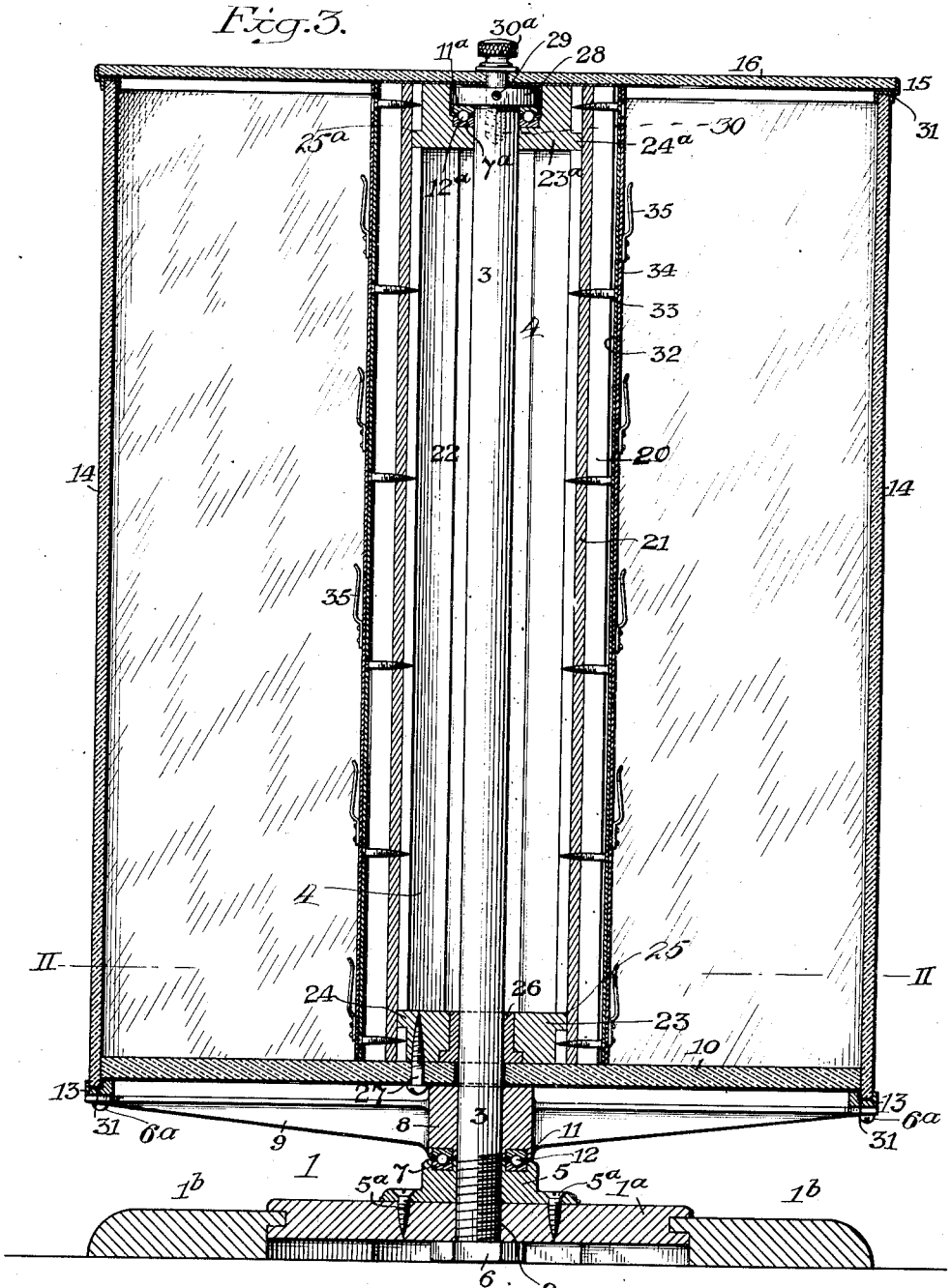
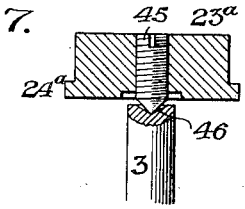
Inventors;
John E. Talley,
J. W. Thompson,
by their Attorneys,
Howson & Howson

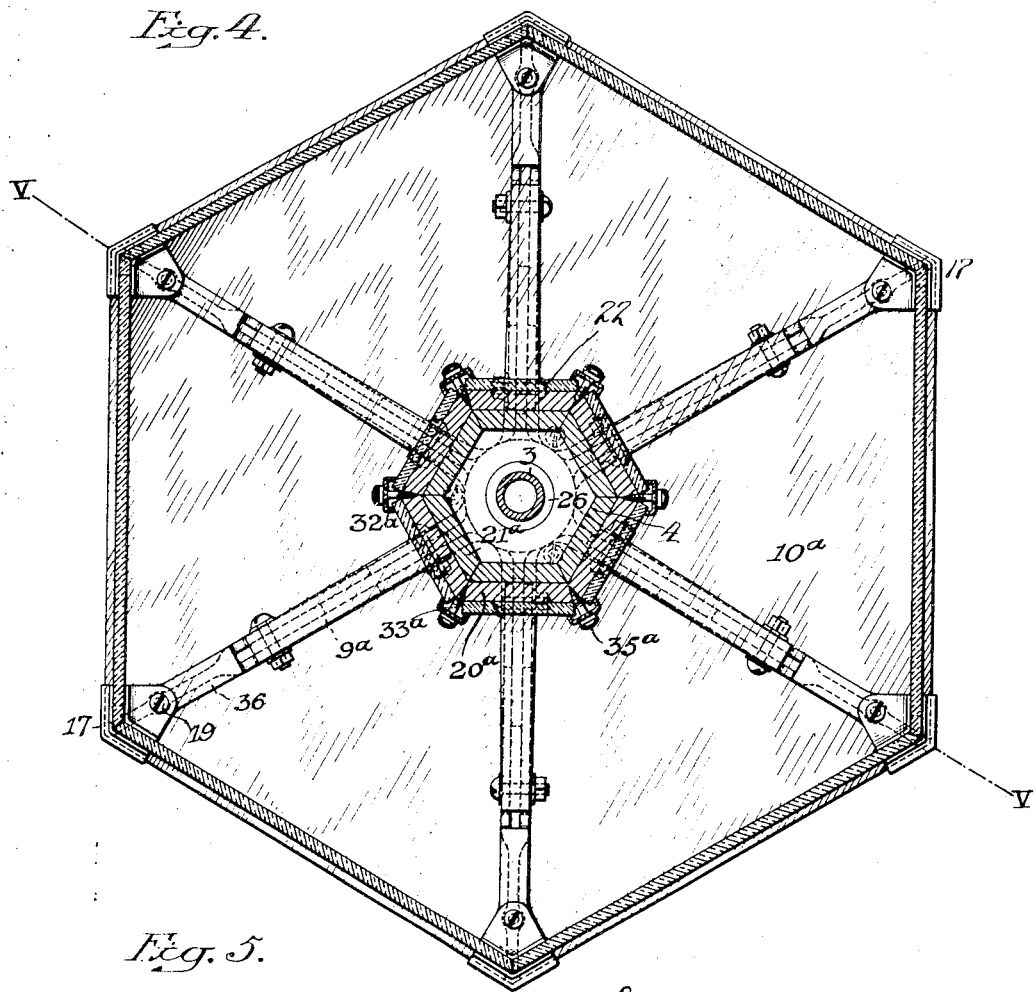
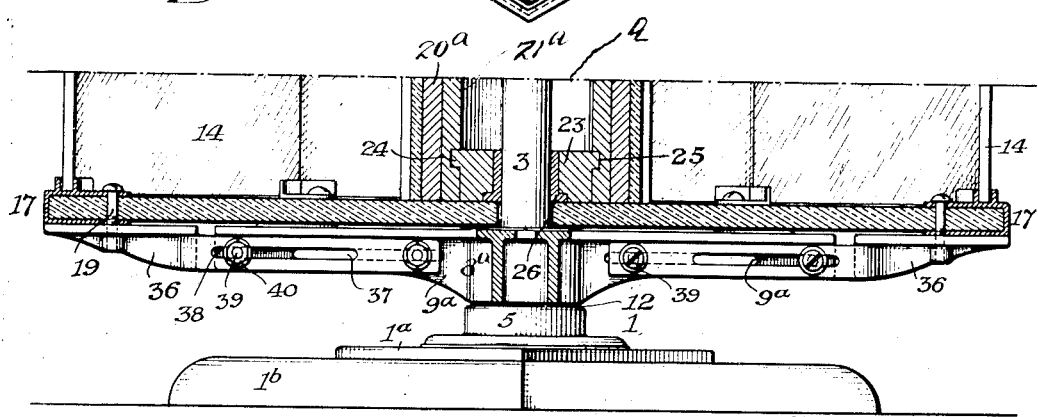

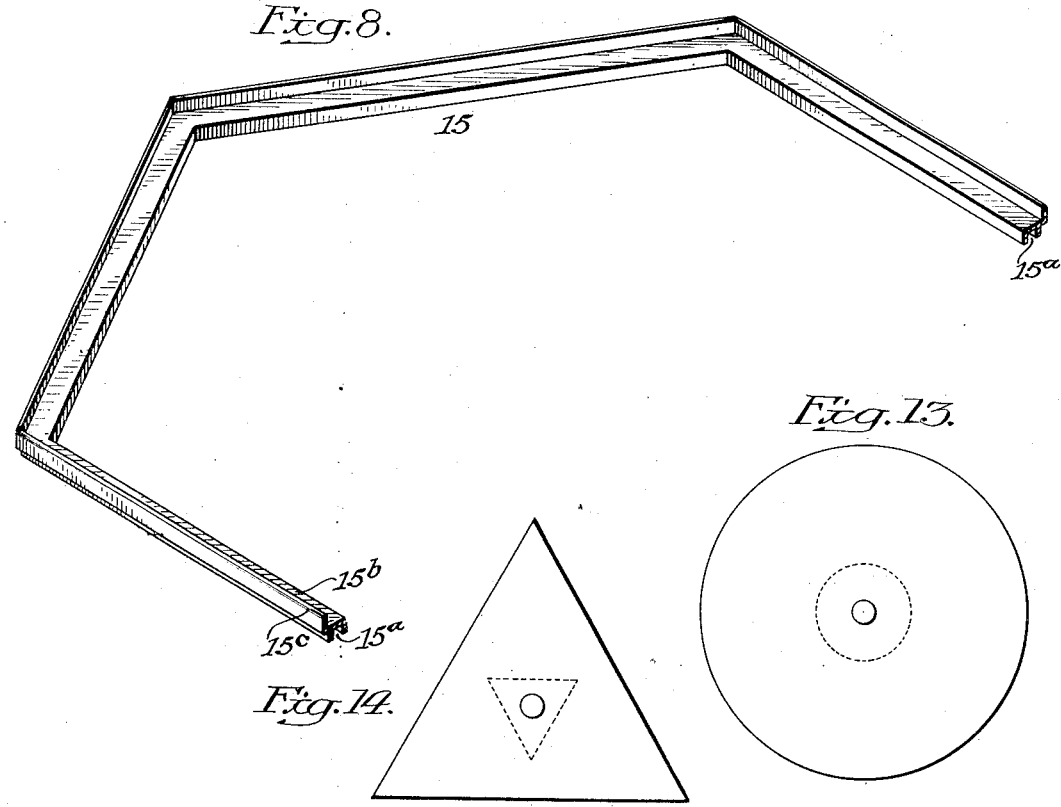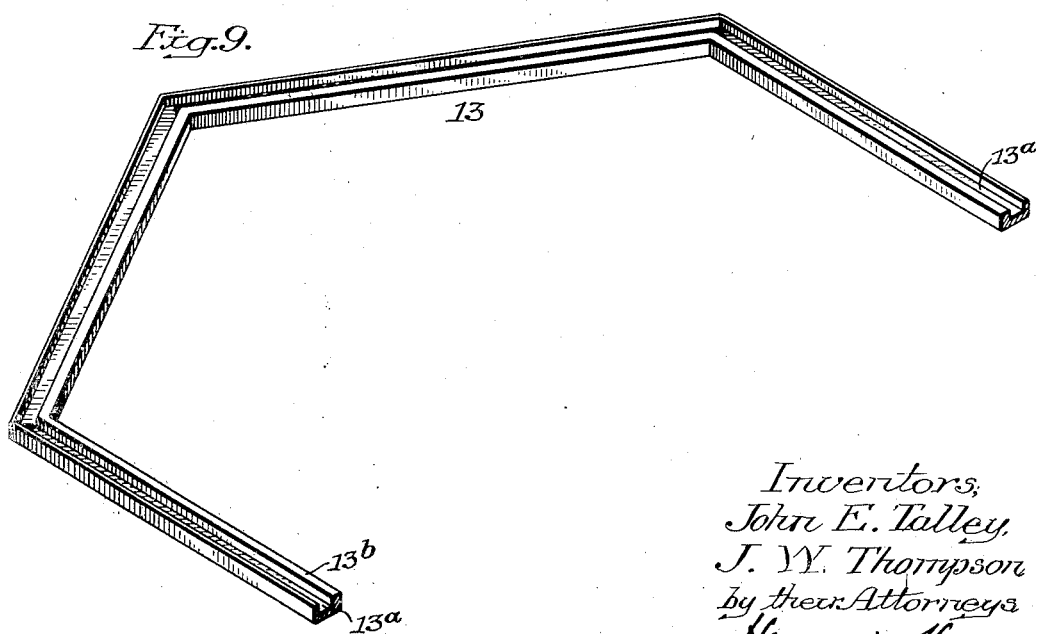

UNITED STATES PATENT OFFICE.

JOHN E. TALLEY AND JOHN WILMER THOMPSON, OF PHILADELPHIA, PENNSYLVANIA.

DISPLAY APPARATUS.

1,393,050.  Specification of Letters Patent.  Patented Oct. 11, 1921.

Application filed June 7, 1918. Serial No. 238,688.

*To all whom it may concern:*

Be it known that we, JOHN E. TALLEY and JOHN WILMER THOMPSON, citizens of the United States, and residents of Philadelphia, Pennsylvania, have invented certain Improvements in Display Apparatus, of which the following is a specification.

Our invention relates to display fixtures or cabinets, and consists more particularly of a rotatable structure, or a structure having a rotatable part, arranged to carry goods to be displayed; which fixture may be of any suitable cross sectional contour in plan, and may comprise a base of sufficient weight to rest upon a sales counter, shelf, or similar support, with the rotatable structure or rotatable part surmounting said base. The rotatable structure may comprise a central pedestal surrounded by a glass inclosure, and while the latter may be fixed it is usually movable with the pedestal; the pedestal carrying goods supporting means and being preferably provided with a removable portion (or portions) for a purpose to be described.

Our present structure has been devised more particularly for the display of collars; the pedestal being provided with racks adapted to receive and support collars or other goods, or with clips to which the collars or other goods may be secured, which collars may be easily viewed through the glass walls of the casing or inclosure. It will be understood, of course, that other articles of merchandise may be mounted in and displayed by means of a cabinet such as we have devised, and that in some instances it may be desirable to provide shelves supported by and revoluble with the pedestal.

These and other features of our invention are more fully described hereinafter, reference being had to the accompanying drawings, in which:

Fig. 2, is a sectional plan view on the line II—II, Fig. 3.

Fig. 3, is a sectional elevation on the line III—III, Fig. 2.

Fig. 4, is a sectional plan view, similar to Fig. 2, illustrating a modification within the scope of our invention.

Fig. 5, is a sectional elevation of the base portion of the structure shown in Fig. 4, on the line V—V.

Fig. 6, is a perspective view illustrating a detail of the structure shown in Figs. 1, 2 and 3.

Fig. 7, is a sectional view illustrating a modification of a part of the structure shown in Fig. 3.

Figs. 8 and 9, are perspective views of top and bottom frames which we may employ with the structure shown in Figs. 1, 2 and 3, to receive the glass walls.

Figure 10:
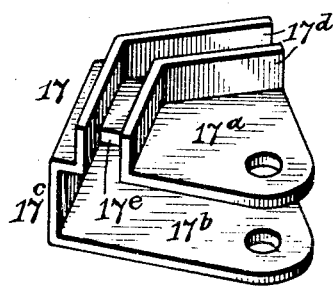
Figure 11:
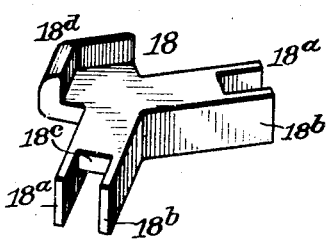

Figs. 10 and 11, are perspective views illustrating details of the structure shown in Figs. 4 and 5, and Figs. 12, 13, 14 and 15, are diagrammatic views illustrating various shapes in which our improved display fixture or cabinet may be made.

Our improved counter cabinet or display structure comprises a base 1, which may be of wood or metal, or a combination of wood and metal, and may be in two parts as shown, in which instance the inner portion directly connected to and supporting the pedestal is indicated at $1^a$, and the outer frame for contact with the counter top is indicated at $1^b$. The under surface of the part $1^b$ may be covered with felt, or other fabric, or a ring of rubber may be let into the same. The part $1^a$ of the base is centrally apertured, as indicated at 2, for the reception of the threaded end of a tubular member or rod 3 forming the core of the pedestal 4, which tubular member or rod may extend to the top of the structue. The tubular member or rod 3 may also be threaded into a central boss 5 supported by the part $1^a$ of the base, and it may be retained in position with respect to the base by a lock nut 6. The boss 5 may be a separate piece secured to the part $1^a$ of the base, as indicated by the drawing, or, when the part $1^a$ is of metal, it may be integral therewith. The boss 5 carries an ball race 7, and when this portion of the structure is an independent or separable piece, it may be provided with a set screw for engagement with the centrally disposed tubular member or rod 3, in lieu of the screws $5^a$ securing it to the part $1^a$.

Disposed above the ball race 7 is the rotatable bottom support of the casing or cabinet structure proper, which may comprise a central hub 8, and arms 9 carried thereby and underlying the bottom plate 10 of the casing; the hub being adapted to rotate with respect to the tubular member or rod 3 and provided with a ball race 11, between which and the ball race 7 of the boss 5, or base part 1ª, anti-friction balls 12 are interposed. The hub 8 carries a plurailty of arms 9, six in the present instance, which underlie the bottom plate 10 of the casing, which plate may be of any suitable material as may be desired, and is shown herewith as of glass. By preference, the arms 9 extend to the outer wall of the casing and carry at their outer ends corner members, or marginal frames 13 adapted to receive the glass plates 14 constituting the sides or walls which make up the casing of the cabinet. When a frame such as 13 is provided, the arms 9 may be secured thereto by screws 6ª. By making the ends of the arms adjustable; one such arrangement being hereinafter described, enlargement of the casing by the use of larger sized sheets of glass for the top, bottom and sides thereof is easily accomplished.

In addition to the frame 13 to receive the bottom edges of the glass plates 14, a frame 15 is provided to receive the top edges of the same, and these frames may be of the character shown in Figs. 8 and 9, where they are shown as grooved at 13ª and 15ª to receive said glass plates; the lower frame 13 having an inner flange 13ᵇ upon which the bottom plate 10 rests, while the upper frame 15 is provided with a ledge 15ᵇ upon which the top plate 16 rests, and a flanged wall 15ᶜ surrounding the marginal edge of the top plate.

In lieu of this arrangement, we may provide corner brackets or frames 17 and 18, of the character indicated in Figs. 10 and 11; the bracket 17 shown in Fig. 10, being employed at the bottom of the structure as shown in Figs. 4 and 5, while the bracket 18 shown in Fig. 11, may be employed at the top of the structure. The brackets 17 comprise upper and lower plates 17ª and 17ᵇ connected by a web 17ᶜ, between which plates the corners or other portions of the bottom glass plate 10ª may be received and held thereto by a bolt or screw 19. The upper part of the bracket is provided with flanges 17ᵈ to receive the lower corners of the glass plates 14 forming the sides or walls, and the latter may be recessed at the ends (not shown) so as to accommodate themselves to the bottom 17ᵉ between the flanges 17ᵈ. The upper brackets 18 have flanges 18ª and 18ᵇ receiving the upper corners of the glass side plates 14, which may also be recessed (not shown) to accommodate the web 18ᶜ connecting the flanges 18ª and 18ᵇ, and these brackets are provided with a marginal projection 18ᵈ for engagement with a corner of the top plate 16; the latter in such instance being designed to rest upon the upper edges of the glass plates 14 forming the sides, and the upper surface of said brackets 18.

In the present structure, a hexagonal casing is provided, and preferably the central pedestal 4 is also hexagonal and may comprise a structure such as shown in Figs. 2 and 6, made up of sections 20, keyed in position by the vertical members 21; each of said sections 20 having on the outer face thereof a mirror 22. The pedestal may be centrally positioned by means of a plate or block 23 at the bottom, having a flange 24 to engage grooves 25 in the inner walls of the pedestal sections 20, and a collar 26 through which the tubular member or rod 3 passes; such plate 23 being secured to the bottom 10 by suitable screws 27 which pass through the same. The top of the pedestal may be similarly connected together by a plate or block 23ª, having a flange 24ª engaging grooves 25ª in the inner walls of the pedestal sections 20, and the tubular member or rod 3 may extend through said plate 23ª and have a suitable nut or collar 28 at the upper end which retains the parts in position, and which may be secured to said tubular member or rod 3 by a set screw 29. Between this collar and a recess in the plate 23ª, ball races 7ª and 11ª may be disposed, with a set of anti-friction balls 12ª interposed between the same. The upper end of the tubular member or rod may be provided with a threaded socket 30 to receive a stud or set screw 30ª to hold the top plate 16 against accidental displacement.

In order to render the structure substantially dust-tight, strips or layers of felt 31 may be interposed between the several sheets of glass constituting the top, bottom and sides of the casing and their carriers or supports, and felt strips may also be disposed at the vertical joints between the glass plates 14 forming the sides of the structure; being glued or otherwise secured to the same if necessary. A layer of felt may also be interposed between the hub 8 and the bottom plate 10, and between the top of the pedestal and the top plate 16.

Figure 1:
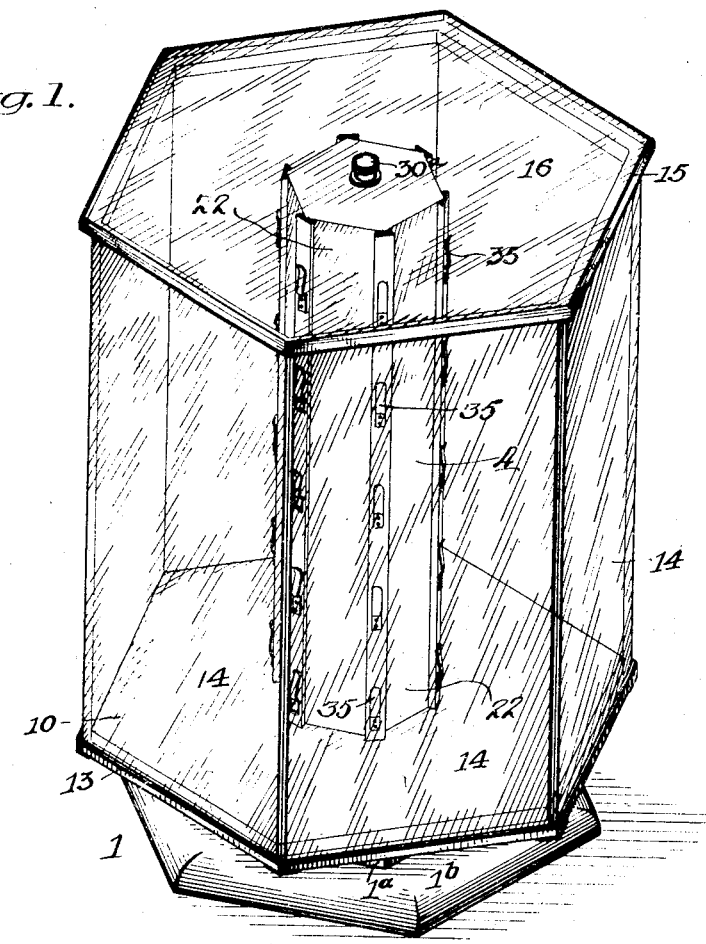
Figure 1, is a perspective view of one form of display fixture or cabinet made in accordance with our invention.

At the corners of the sections 20 forming the pedestal 4 of the structure shown in Figs. 1, 2 and 3, we preferably provide metallic strips 32, which may be of channel-shape, to engage the edges of the mirrors 22 and serve to hold the same in place; being secured to the pedestal by screws 33. These strips may be dove-tail in cross-section and arranged to receive flanged bars 34, which may also be of channel-shape, fitting over the strips 32 and carrying clips 35 whereby the collars or other goods for display may be retained in proper viewing position. By this arrangement, it is possible to dress the bars 34 with the various styles of collars, (or other goods to be displayed) outside the casing and then set the same in place from the top; the top plate 16 being removable after the set screw 30ª is taken out, for this purpose.

In other instances, it may be desirable to make the entire pedestal, or at least the outer portion of the same, removable, in order that it may be dressed with the collars or other goods displayed, outside the cabinet and then inserted in the same. This construction is shown in Figs. 4 and 5, and comprises a pedestal made with an inner portion of sections 21ª held to the rest of the structure in the manner illustrated in Figs. 2 and 3, and an outer shell made of sections 20ª. At the corners of these sections, flanged strips or bars 32ª may be provided which engage and secure the mirror sections in place; being held by screws 33ª, and these bars may directly carry clips 35ª whereby the collars may be supported in position. In other instances, the pedestal and all of its accessories, including the collar-holding clips, may be fixed with respect to the casing and the collars or other articles to be displayed may be independently set in from the top. In some instances, one or more of the glass plates making up the side walls of the inclosing casing may be hinged in some suitable or convenient manner to the base, or to the top and bottom frames, or to any other convenient part of the casing so as to render the interior accessible from the sides.

In Figs. 4 and 5, we have shown a form of structure embodying a further modification in which the arms 9ª of the hub 8ª are provided with adjustable portions 36 at their outer ends, to which adjustable portions the corner brackets 17 and 18, shown in Figs. 10 and 11, are secured. The arms 9ª and these outer portions 36 are slotted at 37 and 38, and are secured together by bolts and nuts 39 and 40, so that they may be extended or contracted when it is desired to provide a cabinet of larger or smaller size; it only being necessary to correspondingly increase or diminish the size of the top and bottom plates, as well as the glass side plates.

In the form of structure shown in Fig. 3, we have shown a ball bearing at the upper portion of the tubular member or rod 3. In some instances, it may be desirable to provide a point bearing, and in such case the upper portion of the pedestal may carry an adjustable point 45 for engagement with a seat 46 formed in the top of the said tubular member 3, and an arrangement of this character is shown in Fig. 7.

While we have shown a display fixture in which the casing is hexagonal with a hexagonal pedestal carrying the goods to be displayed within the same, it will be understood, of course, that the casing may have any other contour desired, and in Figs. 12, 13 and 14, we have illustrated some other forms of casings; those shown being respectively square, round and triangular. The pedestals, centrally disposed with reference thereto, may have a similar contour if desired, or pedestals of any shape may be set in the casings or cabinets irrespective of the shape of the latter, without departing from our invention.

While the improved cabinet forming the subject of our invention is described as generally intended for the reception of collars whereby the latter may be exposed to view and maintained in a clean condition, it is obvious that many other articles of merchandise may be exhibited in such a structure, and that in lieu of the clips carried by the central pedestal whereby the collars may be supported, shelves and various other forms of supports to be carried by the central pedestal or the side wall could be employed. The structure, too, may be of any shape vertically, without departing from our invention.

It will be understood, of course, that changes may be made in the various details of construction without departing from our invention, and that while definite embodiments of our invention have been shown in the accompanying drawings and described with more or less particularity, we do not wish to be limited to the constructions disclosed; desiring to claim broadly any construction capable of performing the function for which our improved display cabinet has been designed.

It will be also understood that while we have shown a relatively fixed base surmounted by a rotatable structure comprising a casing, preferably transparent, and a pedestal centrally mounted and rotatable with said casing, that the latter may be fixed with the base and the pedestal arranged to rotate within such fixed casing, and such structure is intended to be within the scope of the appended claims.

Figure 15:
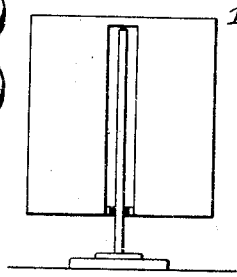

In Fig. 15, we have shown a form of structure in which the casing is suspended from the top upon the upper end of a central pedestal with suitable anti-friction bearings adjacent the lower part of the casing.

We claim:

1. In a display fixture, the combination of a base, a transparent casing surmounting said base, a central pedestal having a plurality of plane surfaces, a removable bar carried by said central pedestal at the junction of said plane surfaces, and goods supporting means mounted on said removable bar.

2. The combination, in a display fixture, of a base having a central standard surmounting the same, a rotatable member including a hub and radial arms carried by said hub, a peripheral frame carried at the outer ends of said arms, a transparent bottom plate supported by said arms, transparent plates vertically mounted in said peripheral frame to form an inclosing casing, a peripheral frame at the top of said plates, a transparent plate forming a cover and fitting said upper frame, a removable pedestal adapted for placement over the central stem of the base and movable with said hub, and means for anchoring the top plate and the pedestal to the central standard.

3. The combination, in a display fixture, of a base having a central standard, a rotatable member comprising a hub having arms, a pedestal adapted for placement over the central stem of the base, a peripheral frame carried at the outer ends of the arms, a bottom plate overlying said arms, means for securing said pedestal to the bottom plate, transparent plates vertically mounted in said peripheral frame to form a casing, a peripheral frame at the top of said plates, a cover plate disposed therein and overlying the vertically mounted plates, and means for anchoring said cover plate to the pedestal.

4. In a display fixture, the combination of a base, a casing mounted on said base, a pedestal carried by said casing and made up of a plurality of sections, mirrors carried by said sections, longitudinal members for holding said mirrors in position, removable pieces mounted on said mirror-holding members, and goods supporting members carried by said removable pieces.

JOHN E. TALLEY.
J. WILMER THOMPSON.